(12) United States Patent
Sauer

(10) Patent No.: US 9,026,335 B2
(45) Date of Patent: May 5, 2015

(54) SPEED CONTROL SYSTEM AND METHOD HAVING A DISTANCE SENSOR, INTENDED FOR A MOTOR VEHICLE

(71) Applicant: Bayerische Motoren Werke Aktiengesellschaft, Munich (DE)

(72) Inventor: Thomas Sauer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 80 days.

(21) Appl. No.: 13/826,904

(22) Filed: Mar. 14, 2013

(65) Prior Publication Data

US 2013/0204505 A1 Aug. 8, 2013

Related U.S. Application Data

(63) Continuation of application No. PCT/EP2011/065846, filed on Sep. 13, 2011.

(30) Foreign Application Priority Data

Sep. 15, 2010 (DE) .......................... 10 2010 040 789

(51) Int. Cl.
*B60K 31/00* (2006.01)
*B60W 30/17* (2012.01)
*B60W 50/00* (2006.01)

(52) U.S. Cl.
CPC .......... *B60K 31/00* (2013.01); *B60K 2031/0016* (2013.01); *B60K 2310/26* (2013.01);
(Continued)

(58) Field of Classification Search
CPC ................... B60K 31/0008; B60K 2031/0016; B60K 2031/0025; G08G 1/165
USPC ...................... 701/96, 97, 300, 301
See application file for complete search history.

(56) References Cited

U.S. PATENT DOCUMENTS 6,496,770 B2 * 12/2002 Winner et al. ................... 701/96
6,708,099 B2 * 3/2004 Tellis et al. ...................... 701/96
(Continued)

FOREIGN PATENT DOCUMENTS

CN 1898101 A 1/2007
CN 101326074 A 12/2008
(Continued)

OTHER PUBLICATIONS

International Search Report dated Mar. 6, 2012 with English translation (four (4) pages).

(Continued)

*Primary Examiner* — Russell Frejd
*Assistant Examiner* — Peter D Nolan
(74) *Attorney, Agent, or Firm* — Crowell & Moring LLP

(57) ABSTRACT

A motor vehicle speed control system having a distance sensor operates in a first mode when the vehicle is traveling on a clear stretch of road in which a predetermined desired vehicle speed is set. In a second mode when the vehicle is following another vehicle, a predetermined minimum distance from a selected target object is set. The target object is selected by a first selection process that screens out stationary objects. When a defined condition prevails, the first mode switches into a third mode in the form of deceleration, wherein a second selection process is started which also evaluates stationary target objects. Until a target object is selected, the vehicle travels on a clear road with deceleration initiated which is reduced relative to following another vehicle. If a target object is selected by the second selection process, the system switches over without delay from the third mode into the second mode.

7 Claims, 1 Drawing Sheet

(52) U.S. Cl.
CPC .......... *B60W 30/17* (2013.01); *B60W 50/0098*
(2013.01); *B60W 2050/0095* (2013.01); *B60W 2550/302* (2013.01); *B60W 2550/306* (2013.01); *B60W 2550/308* (2013.01)

(56) References Cited

U.S. PATENT DOCUMENTS

| | | | |
|---|---|---|---|
| 6,854,548 B2* | 2/2005 | Kuroda et al. | 180/170 |
| 7,099,766 B2* | 8/2006 | Michi et al. | 701/96 |
| 7,178,819 B2* | 2/2007 | Scherl et al. | 180/170 |
| 7,321,818 B2* | 1/2008 | Michi et al. | 701/96 |
| 7,706,954 B2* | 4/2010 | Michi et al. | 701/96 |
| 2003/0168271 A1 | 9/2003 | Massen | |
| 2003/0173128 A1 | 9/2003 | Kuroda et al. | |
| 2005/0055150 A1* | 3/2005 | Uhler et al. | 701/93 |
| 2007/0142994 A1* | 6/2007 | Boecker et al. | 701/93 |
| 2008/0133103 A1* | 6/2008 | Meske et al. | 701/96 |
| 2010/0152963 A1* | 6/2010 | Heckel et al. | 701/34 |
| 2011/0106364 A1 | 5/2011 | Braeuchle et al. | |

FOREIGN PATENT DOCUMENTS

| | | |
|---|---|---|
| DE | 103 03 611 A1 | 8/2004 |
| DE | 103 19 337 A1 | 11/2004 |
| EP | 1 065 087 A2 | 1/2001 |
| EP | 1 304 251 B1 | 9/2008 |
| WO | WO 2004/096598 A1 | 11/2004 |
| WO | WO 2007/069997 A1 | 6/2007 |

OTHER PUBLICATIONS

German Search Report dated Feb. 14, 2011 with partial English translation (nine (9) pages).
Chinese Office Action dated Dec. 3, 2014, with English translation (Thirteen (13) pages).

\* cited by examiner

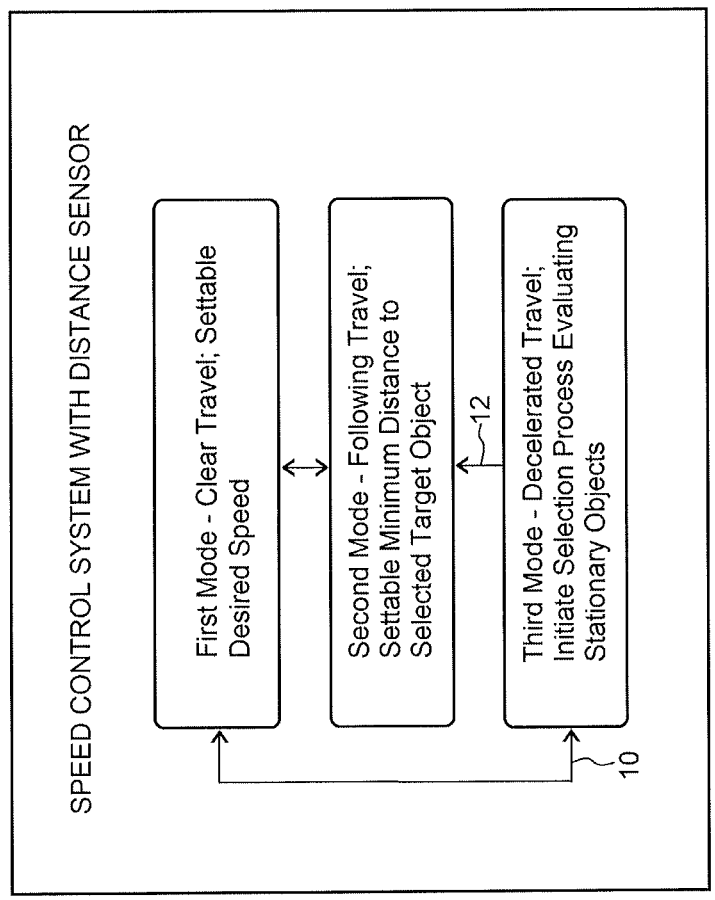

SPEED CONTROL SYSTEM AND METHOD HAVING A DISTANCE SENSOR, INTENDED FOR A MOTOR VEHICLE

CROSS REFERENCE TO RELATED APPLICATIONS

This application is a continuation of PCT International Application No. PCT/EP2011/065846, filed Sep. 13, 2011, which claims priority under 35 U.S.C. §119 from German Patent Application No. DE 10 2010 040 789.5, filed Sep. 15, 2010, the entire disclosures of which are herein expressly incorporated by reference.

BACKGROUND AND SUMMARY OF THE INVENTION

The invention relates to a speed control system and method having a distance sensor, which is intended for a motor vehicle (the motor vehicle having the distance sensor being the "ego vehicle").

Speed control systems having an automatic distance control, also called ACC ("Active Cruise Control" or "Adaptive Cruise Control"), have been known in the automobile trade, including in the applicant's vehicles, for several years. They basically permit two modes: traveling on a clear stretch of road at a predetermined desired vehicle speed when no vehicle (object) driving ahead is detected, and following another vehicle at a predefined desired distance, when a vehicle driving ahead is detected as a target object. From a technical point of view, such speed control systems can be understood to be an expansion of the conventional cruise control by use of a distance sensor, which supplies information, such as distance and speed of additional vehicles (objects) in the driving environment of the ego vehicle to the ACC controller. At first, these ACC systems were conceived only for use on turnpikes (autobahn) and well developed highways and expressways and were limited to a speed range above 30 km/h. Especially, the operation of such systems in a traffic jam was therefore not possible. This gap, however, was closed by the next generation of such systems, the so-called ACC stop-and-go systems.

An ACC stop-and-go system decelerates the ego vehicle to a stationary position and automatically causes it to start moving again within certain time thresholds in order to follow a vehicle traveling in front. The form of this ACC stop-and-go system, however, has the disadvantage of not reacting to a-priori stationary vehicles, thus to vehicles that had never been detected by the sensor as driving, as, for example, the end of a line of vehicles at a red traffic light. The reason is the central technical problem of the ACC systems. It is not sufficient to detect objects from the traffic environment; rather, it also has to be decided whether these objects are in their own traffic lane. This objective is achieved only insufficiently so that there may be a considerable number of erroneous reactions to vehicles in neighboring traffic lanes. Since, as a rule, the distance sensors detect a much higher number of stationary objects (guard rails, traffic signs, bridges, etc.) than moving objects, a general addition of the stationary objects to the potential target objects would result in an unacceptable increase in erroneous brakings.

A speed control system which partially also already includes stationary objects in the control, is known from European Patent document EP 1 304 251 B1. However, in this case, only a braking to the stationary position is taken into account.

It is an object of the invention to further develop a speed control system of the above-mentioned type with a view to preventing erroneous braking while including (a-priori) stationary objects.

This and other objects are achieved according to the invention by a speed control system having a distance sensor for a motor vehicle (ego vehicle), which, in a first mode in the form of traveling on a clear stretch of road, sets a predefined desired vehicle speed and, in a second mode in the form of following another vehicle, sets a predefined minimum distance to a selected target object. The target object in the second mode is selected according to a first selection process which screens out stationary objects as target objects. When at least one defined condition is present, a transition takes place starting from the first mode into a third mode in the form of a decelerated travel, during which a second selection process is started which evaluates also stationary target objects, and during which, until a target object is selected, the vehicle is traveling on a clear road stretch with the initiation of a deceleration with respect to following another vehicle. When a target object is selected by the second selection process, a switch-over immediately takes place from the third mode into the second mode.

Other objects, advantages and novel features of the present invention will become apparent from the following detailed description of one or more preferred embodiments when considered in conjunction with the accompanying drawing.

BRIEF DESCRIPTION OF THE DRAWING

The single FIGURE is a diagram illustrating the operating modes of the speed control system according to an embodiment of the invention.

DETAILED DESCRIPTION OF THE DRAWING

The invention is based on the following considerations. First, for preventing problems when including (a-priori) stationary objects, one solution may be the fusion of object detection systems by way of conventional distance sensors (radar, lidar), on the one hand, and by way of image processing systems, on the other hand. Since the latter system can differentiate between vehicles and other objects, it thereby becomes basically possible to implement an ACC stop-and-go speed control system with a reaction to a-priori stationary targets without significantly increasing the number of erroneous brakings. The ACC operation while taking into account stationary objects in a city environment thereby becomes technically possible. However, such a system still only knows two modes. Either a detected (driving or stationary) object will be assigned to its own lane and a transition takes place into the so-called following mode, or the ACC adjusts, in the so-called clear-road travel mode, the speed set by the driver: thus, either a first mode in the form of traveling on a clear stretch, or a second mode in the form of following another vehicle.

This concept of the two modes, i.e. following travel/clear travel, finally means that the following conflicts are encountered when applying the parameters to a selection process for selecting a target object: (i) either a timely target object selection takes place with the risk of too many erroneous brakings with respect to vehicles in neighboring lanes, or (ii) the number of the last-mentioned errors is reduced with the disadvantage that real target objects are selected too late, so that the driver himself has to brake too often.

This problem is intensified in the case of speed control systems with a reaction to a-priori stationary targets. Even though the image processing now reacts only to vehicles, an incorrect assignment of the traffic lane, which—as mentioned above—is the central problem of the ACC, may nevertheless result in erroneous braking with respect to parked lines of vehicles or stationary vehicles in neighboring lanes. However, a target object selection that is too conservative in the sense of reducing erroneous braking leads to the situation that the braking with respect to vehicles actually present in the ego vehicle lane will be initiated too late. Specifically, in view of the reaction to stationary objects, this does not achieve the objective because, in these situations, high relative speeds (50 km/h or more) have to be reduced. Although stationary vehicles are thereby recognized as target objects, this recognition may take place too late, so that sufficient braking distance is no longer available for the decelerations allowable by an (ACC) speed control system.

The introduction of a third mode for the ACC is a solution to the above-described target conflict, which third mode is described in greater detail in the following and with reference to the FIGURE by way of a particularly advantageous embodiment. The FIGURE illustrates a speed control system with a distance sensor having first through third modes of operation as will be discussed below.

The third mode consists of two parts:
1. What is the third mode?
2. Whereby is it triggered?

1. A transition to the third mode (arrow 10) should be permitted only from the clear-travel mode (first mode). In the third mode, the ACC function continues to remain active, but no longer demands a drive torque from the engine but lets the vehicle transition to a drag torque or to a slight deceleration. The third mode likewise is a moderate decelerated travel. The "target object recognized" display should not be selected; a following travel does not yet exist. All "ACC Active" displays should continue to signal ACC operation; the ACC is not switched off.

If one or more of the following conditions have been met, the ACC should change again from the third mode into the first mode (arrow 10) in the form of clear travel:
  (i) the driver carries out an operating action;
  (ii) the driver excessively depresses the accelerator;
  (iii) the own vehicle (ego vehicle) falls below an applicable lower speed limit; or
  (iv) the third mode lasts longer than an applicable time period.

If the sensor and the target object selection report a target object, an immediate transition should take place into the following-travel mode (second mode) (arrow 12).

2. For the transition into the third mode, at least one of the following conditions should preferably be met:
  (i) the ACC is in the clear-travel mode; or
  (ii) the ego vehicle speed is in an applicable speed interval.
Background: The third mode should only be permitted at typical city speeds.

The selection process or the algorithm for the target object selection detects in an applicable distance range at least N vehicles (N number applicable), in which case none of these vehicles is traveling faster than at an applicable speed limit.

As an option, it should be possible to implement this speed limit as a function of the current ego vehicle speeds.

Especially for ACC systems which permit a reaction to stationary vehicles, as a result of the change into the third mode, the "approach to an intersection or traffic light" situation will be rendered safe, where it may typically happen that a plurality of slower vehicles will be situated in front of the ego vehicle. ACC systems that are currently being developed select a target object too late, so that the driver himself has to brake. Since, as mentioned above, the triggering condition for the third mode is present in such situations, speed is already reduced as a result of the transition to decelerated travel, for example, by providing a drag torque, so that also, in the case of a target object that is selected late, the ACC deceleration will still be sufficient for comfortably coming to a stop behind the target in the ACC control operation as a result of the fast transition from the third mode into the following-travel mode.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of operating a speed control system having a distance sensor for a motor vehicle, the method comprising the acts of:
  providing a first mode of operation when the vehicle is traveling on a clear stretch of road, in which a predefined desired vehicle speed is settable;
  providing a second mode of operation when the vehicle is following another vehicle, in which a predefined minimum distance to a selected target object is settable, the target object in the second mode being selected according to a first selection process that screens out stationary objects as target objects;
  in an event of a presence of at least one defined condition, changing the operation of the speed control system when in the first mode of operation into a third mode of operation, in which the motor vehicle undergoes decelerated travel, wherein the at least one defined condition comprises a recognition of a minimum number of objects in a predefined distance range; and
  in the third mode of operation, starting a second selection process that evaluates stationary objects, wherein until a selection of a target object is made, the vehicle operates in the third mode as a vehicle traveling on a clear road with an initiated deceleration which is reduced with respect to following travel.

2. The speed control method according to claim 1, wherein the at least one defined condition further comprises a vehicle speed of the motor vehicle below a first predefined motor vehicle speed threshold.

3. The speed control method according to claim 2, wherein speeds of said minimum number of objects being below a predefined object speed threshold.

4. The speed control method according to claim 3, wherein at least one of the motor vehicle speed threshold and the object speed threshold is definable as a function of an actual vehicle speed of the motor vehicle.

5. The speed control method according to claim 1, wherein speeds of said minimum number of objects being below a predefined object speed threshold.

6. The speed control method according to claim 5, wherein at least one of the motor vehicle speed threshold and the object speed threshold is definable as a function of an actual vehicle speed of the motor vehicle.

7. The speed control method according to claim 1, wherein a transition takes place from the third mode in the form of the decelerated travel into the first mode when at least one of the following occurs:
  (a) a manual operating action is carried out by a driver;
  (b) an accelerator pedal is operated;
  (c) the motor vehicle falls below a second lower motor vehicle speed threshold; and
  (d) the third mode exceeds a defined time period.

* * * * *